L. R. FORNEY.
MACHINES FOR SOWING TOBACCO SEED.
No. 178,281. Patented June 6, 1876.
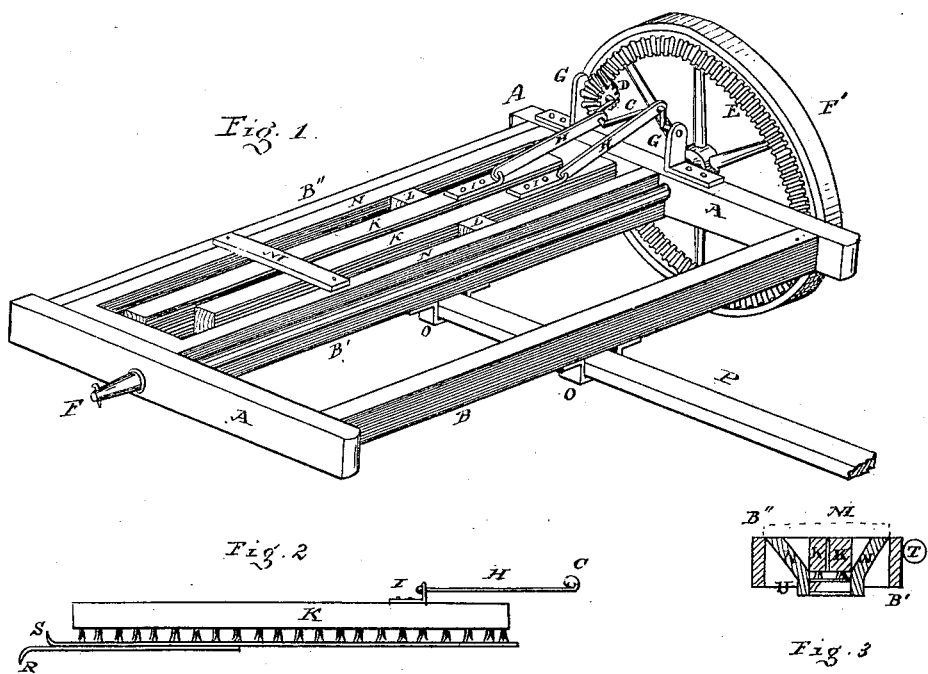
WITNESSES
W. B. Wiley
Jacob Stauffer
INVENTOR
Levi R. Forney

UNITED STATES PATENT OFFICE.

LEVI R. FORNEY, OF LANCASTER COUNTY, PENNSYLVANIA.

IMPROVEMENT IN MACHINES FOR SOWING TOBACCO-SEED.

Specification forming part of Letters Patent No. 178,281, dated June 6, 1876; application filed April 1, 1876.

*To all whom it may concern:*

Be it known that I, LEVI R. FORNEY, near Litiz, in the county of Lancaster, and the State of Pennsylvania, have invented certain Improvements in Sowing Tobacco-Seed, of which the following is a specification:

The object of this invention is to supply a means for distributing the fine seeds of the tobacco-plant in garden-beds prior to transplanting to the field; and to supply this want so greatly felt I have constructed and employed a miniature hand seeding-machine, with a hopper—say, eighteen inches long—on a frame mounted on two small wheels.

The accompanying drawing illustrates this small hand sowing-machine with the letters of reference marked thereon, and a brief explanation will enable those skilled in the art to make and use the same, and in which—

Figure 1 is a perspective view of the seeding-machine; Fig. 2, a brush and slide plates, shown; Fig. 3, end view of the hopper.

The frame, composed of the side pieces A, and cross-pieces B, the axle T, and two wheels with the pole P, are on the same plan of construction as in the large field sowing-machines.

The hopper N sits down between the rear cross-pieces B' B'', and is made removable. The bottom is open and grooved on the sides, with the one end open below for the introduction of a slide plate or plates, R S. The plate S is perforated. Several plates, variously perforated, may be had and exchanged at pleasure by simply raising the outer end of the hopper, and drawing out one and inserting another. I also use two shafts, K, nearly the length of the hopper, which are provided with bristles, brush-fashion, on the under side resting upon the perforated bottom. These brush-shafts K are severally connected by a plate, I, and rod H, with a double crank, C, in bearings G on the frame. This crank-shaft also bears a small bevel-pinion, D, which receives motion from a cogged wheel, E, on the inner side of one of the wheels of the small vehicle. Thus, by drawing the small machine over the soil prepared to receive the seed from the hopper these brushes are alternately drawn back and forth over the perforated bottom to scatter the minute seeds with the greatest satisfaction, and in a more perfect manner than by any device or means heretofore known or used for this special purpose where a large farm-machine cannot be used.

I am aware that the double crank and beveled gear are not new, nor is the hopper with the perforated bottom. On field-machines all these parts may be found variously arranged and combined, and claimed. In patent No. 84,296, November 24, 1868, a double crank is shown, with a horizontal and a perpendicular sliding bar in the seed box or hopper, driven by gear attached to the hub of the wheel; but I am not aware that any seeding-machine has been constructed combined with sliding bottom in a removable seed-box having two parallel brushes reciprocating over the bottom to distribute the seed evenly, with the crank arranged upon the frame for a pinion and cogwheel connection.

What I claim, therefore, is—

In a hand seed-drill, the combination of the reciprocating brushes K K, with the perforated plates R S, and operating mechanism, substantially as and for the purpose specified.

LEVI R. FORNEY.

Witnesses:
W. B. WILEY,
JACOB STAUFFER.